(12) United States Patent
Shen

(10) Patent No.: US 11,125,267 B2
(45) Date of Patent: Sep. 21, 2021

(54) ATTACHMENT STRUCTURE

(71) Applicant: ASIA VITAL COMPONENTS CO., LTD., New Taipei (TW)

(72) Inventor: Ching-Hang Shen, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 0 days.

(21) Appl. No.: 16/384,937

(22) Filed: Apr. 16, 2019

(65) Prior Publication Data
US 2019/0368534 A1 Dec. 5, 2019

(30) Foreign Application Priority Data
May 29, 2018 (TW) ................... 107118293

(51) Int. Cl.
*F16B 47/00* (2006.01)
*C09J 9/00* (2006.01)
*C09J 7/20* (2018.01)

(52) U.S. Cl.
CPC ............... *F16B 47/003* (2013.01); *C09J 7/20* (2018.01); *C09J 9/00* (2013.01); *C09J 2203/366* (2020.08); *C09J 2301/10* (2020.08); *C09J 2301/124* (2020.08); *C09J 2301/204* (2020.08); *Y10T 428/14* (2015.01)

(58) Field of Classification Search
CPC ......... F16B 47/003; F16B 11/006; C09J 7/20; C09J 9/00; C09J 7/30; C09J 2201/28; C09J 2203/366; C09J 2301/10; C09J 2301/124; C09J 2301/204; Y10T 428/14
See application file for complete search history.

(56) References Cited

U.S. PATENT DOCUMENTS

| | | | | | |
|---|---|---|---|---|---|
| 4,460,634 | A | * | 7/1984 | Hasegawa | G09F 15/02 156/289 |
| 5,585,178 | A | * | 12/1996 | Calhoun | B32B 7/12 428/343 |
| 9,333,725 | B2 | * | 5/2016 | Chuang | C09J 5/06 |
| 2009/0162595 | A1 | * | 6/2009 | Ko | B05C 9/06 428/41.9 |
| 2009/0291279 | A1 | * | 11/2009 | Schroeer | C09J 7/38 428/214 |
| 2016/0137885 | A1 | * | 5/2016 | Maier | C09J 7/22 428/41.8 |

FOREIGN PATENT DOCUMENTS

| | | |
|---|---|---|
| CN | 201148011 Y | 11/2008 |
| CN | 102378796 B | 3/2012 |

(Continued)

*Primary Examiner* — Patricia L. Nordmeyer
(74) *Attorney, Agent, or Firm* — Thomas J. Nikolai; DeWitt LLP

(57) ABSTRACT

An attachment structure includes a main body and a first adhesive layer. The main body has an upper side as a first side and a lower side as a second side. The first adhesive layer is selectively disposed on one of the first and second sides. The first adhesive layer has multiple first passages. The first passages divide the first adhesive layer into multiple first adhesive blocks. By means of the first passages of the first adhesive layer, when the main body is attached to another unit, the main body can be more easily and tightly attached to the unit without producing any void or blister.

21 Claims, 12 Drawing Sheets

(56) References Cited

FOREIGN PATENT DOCUMENTS

| | | | |
|---|---|---|---|
| CN | 102729529 | A | 10/2012 |
| CN | 202656523 | U | 1/2013 |
| CN | 103930503 | B | 7/2014 |
| CN | 104662113 | B | 5/2015 |
| CN | 205167763 | U | 4/2016 |
| CN | 205185487 | U | 4/2016 |
| CN | 105563973 | A | 5/2016 |
| CN | 205395345 | U | 7/2016 |
| CN | 105835965 | A | 8/2016 |
| CN | 106133094 | B | 11/2016 |
| CN | 107805464 | A | 3/2018 |
| CN | 107849398 | A | 3/2018 |
| JP | 2011206998 | A | 10/2011 |
| KR | 1020150012815 | A | 2/2015 |

\* cited by examiner

ATTACHMENT STRUCTURE

This application claims the priority benefit of Taiwan patent application number 107118293 filed on May 29, 2018.

BACKGROUND OF THE INVENTION

1. Field of the Invention

The present invention relates generally to an attachment structure, and more particularly to an attachment structure including a main body and a first adhesive layer having multiple first passages. By means of the first passages of the first adhesive layer, the main body can be more tightly attached to another component without producing blister or void.

2. Description of the Related Art

A conventional attachment structure has an adhesive glue layer on at least one side. The attachment structure is mainly applied to and attached to a substrate unit to cover and protect or seal the substrate unit. Alternatively, the attachment structure serves to integrally connect two substrate units with each other.

The attachment structure is substantially classified into two types, that is, single-face adhesive and double-face adhesive. For example, the screen protector for a handheld device pertains to the single-face adhesive type. A layer of plane adhesive is disposed on one face of the screen protector (plastic film or thin glass sheet), whereby the screen protector can be attached to or adhered to the screen to protect the screen from scraping or damage. The attachment structure applied to the graphite sheet and the backboard of the handheld device or the heat conductor and the subsidiary attachment article pertains to the double-face adhesive type. With respect to the double-face adhesive type, a layer of plane adhesive is disposed on each of the upper and lower sides of plate body made of PET. The plane adhesive on the upper and lower sides are respectively attached to or adhered to the graphite sheet and the inner side of the backboard of the handheld device so as to integrally connect the graphite sheet and the backboard with each other. When the attachment article and the subsidiary attachment article are attached to each other, it must be ensured that no void or blister exists between the attachment article and the subsidiary attachment article so that the attachment article and the subsidiary attachment article can be fully attached to each other. Also, the adhesive is for one-time use so that it is impossible to rework. Therefore, a certain extent of skill is required for performing the attachment process. However, both the single-face adhesive attachment structure and the double-face adhesive attachment structure employ the plane adhesive for the adhesion. Therefore, it often takes place that the attachment article and the subsidiary attachment article can be hardly fully attached to each other. Therefore, the planarity of the attachment is poor to produce many crimps and voids.

Some manufacturers selectively employ silicone as the adhesive for the attachment. Silicone is a sort of adhesive having viscosity or no viscosity. In the case that a silicone with no viscosity is employed, the attachment is achieved via the help of static. However, the silicone is fully overlaid on one face of the screen protector so that when attached to the screen, it must be ensured that no void or blister exists between the screen protector and the screen, whereby the screen protector can be fully and tightly adhered to the screen. This is more convenient than the attachment of the aforesaid adhesive and allows reworking. However, a certain extent of skill is still required for performing the attachment process.

It is therefore tried by the applicant to provide an attachment structure, which can be more conveniently and quickly attached to an article to seal and protect the same. The attachment structure also serves to fully adhere multiple layers of articles to each other at high planarity without any crimp or blister.

SUMMARY OF THE INVENTION

It is therefore a primary object of the present invention to provide an attachment structure, which can more conveniently attach two substrate bodies to each other without producing any void or blister.

To achieve the above and other objects, the attachment structure of the present invention includes a main body and a first adhesive layer. The main body has an upper side as a first side and a lower side as a second side. The first adhesive layer is selectively disposed on one of the first and second sides. The first adhesive layer has multiple first passages. The first passages divide the first adhesive layer into multiple equal-size or unequal-size first adhesive blocks.

The first adhesive layer is disposed on at least one side (any of the first and second sides) of the main body, whereby the main body can be adhered to or attached to another article. The first passages of the first adhesive layer divide the first adhesive layer into multiple first adhesive blocks in the form of dots or multiple first adhesive strips in the form of strips. Accordingly, when the main body is attached to another article, the air between the main body and the article can be exhausted so that the main body and the article can be more tightly attached to each other without warping. Therefore, the main body and the article can be fully attached to each other with excellent planarity without producing any crimp or void. Accordingly, the attachment work is facilitated.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
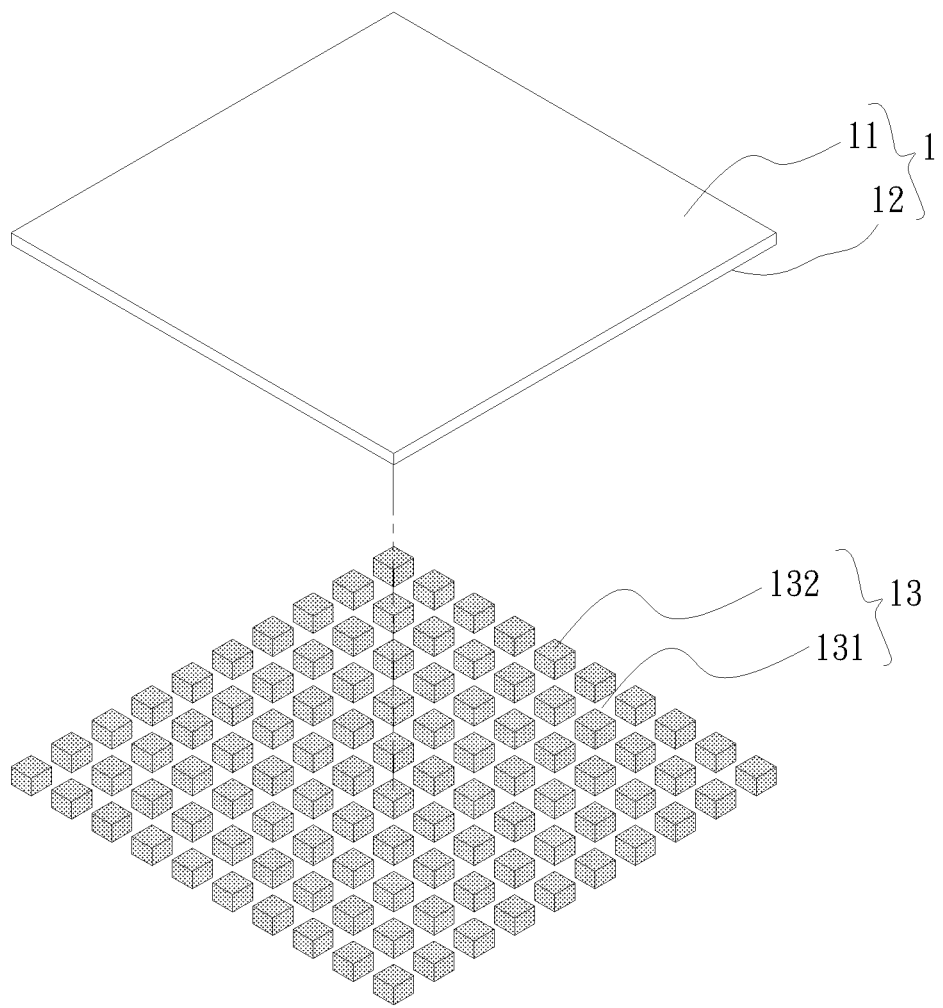
FIG. 1 is a perspective exploded view of a first embodiment of the attachment structure of the present invention.
Figure 2:
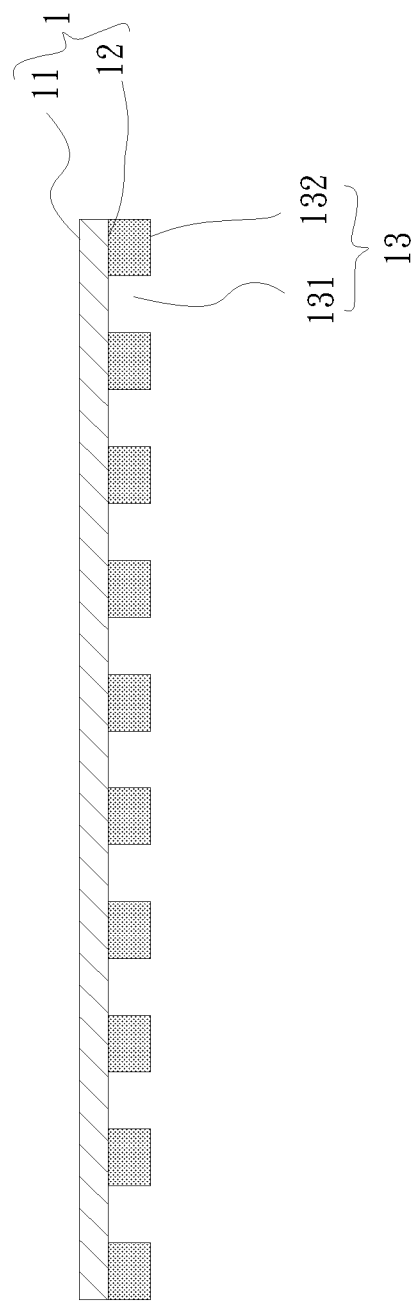
FIG. 2 is a sectional assembled view of the first embodiment of the attachment structure of the present invention.
Figure 3A:
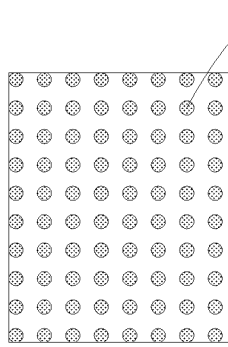
FIG. 3a is a view showing the first adhesive blocks of the first embodiment of the attachment structure of the present invention.
Figure 3B:
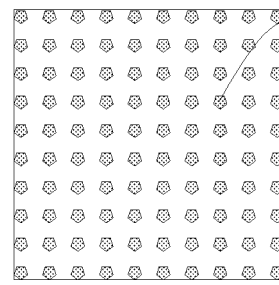
FIG. 3b is a view showing the first adhesive blocks of the first embodiment of the attachment structure of the present invention.

Please refer to FIGS. 1, 2, 3*a* and 3*b*. FIG. 1 is a perspective exploded view of a first embodiment of the attachment structure of the present invention. FIG. 2 is a sectional assembled view of the first embodiment of the attachment structure of the present invention. FIG. 3*a* is a view showing the first adhesive blocks of the first embodiment of the attachment structure of the present invention. FIG. 3*b* is a view showing the first adhesive blocks of the first embodiment of the attachment structure of the present invention. As shown in the drawings, the attachment structure of the present invention includes a main body 1.

The main body 1 has an upper side as a first side 11 and a lower side as a second side 12.

A first adhesive layer 13 is selectively disposed on one of the first and second sides 11, 12. In this embodiment, the first adhesive layer 13 is, but not limited to, selectively disposed on the second side 12. The first adhesive layer 13 has multiple first passages 131.

The main body 1 is flexible or inflexible. The main body 1 is transparent, nontransparent, semitransparent, light-permeable or light-impermeable.

The main body 1 is made of a metal material or nonmetal material. The metal material is selected from a group consisting of gold, silver, copper, aluminum, stainless steel and titanium.

The nonmetal material is selected from a group consisting of porous sintered body (such as ceramic or semiconductor), graphite, polymer and natural polymer. The polymer is selected from a group consisting of foam rubber, polyethylene, polyvinyl chloride, nylon, polytetrafluoroethylene and silicone. The natural polymer is selected from a group consisting of shellac, amber, protein and nucleic acid.

The main body 1 can be alternatively a product structure body such as a circuit board, a heat pipe, a vapor chamber, a touch screen or a protection film.

The first passages 131 of the first adhesive layer 13 are selectively transversely, longitudinally or obliquely arranged to intersect or not to intersect each other. In this embodiment, the first passages 131 are transversely and longitudinally arranged to intersect each other. The first passages 131 divide the first adhesive layer 13 into multiple equal-size or unequal-size first adhesive blocks 132. The first adhesive blocks 132 are arranged at equal intervals or unequal intervals.

Each two adjacent first adhesive blocks 132 define therebetween a hollow space of the first passages 131. The cross section of the first adhesive block 132 has a circular configuration (as shown in FIG. 3*a*) or a polygonal configuration (as shown in FIG. 3*b*) or any other geometrical configuration. The first adhesive blocks 132 can be formed on the second side 12 of the main body 1 by means of dispensing. The first adhesive layer 13 has viscosity or no viscosity. In case that the first adhesive layer 13 is adhesive, the first adhesive layer 13 is selected from a group consisting of thermosetting adhesive, pressure sensitive adhesive, thermoplastic elastic adhesive and hot-melt adhesive. The adhesive is selected from a group consisting of rubber adhesive, acrylate adhesive, polyurethane adhesive and epoxy adhesive.

Figure 4:
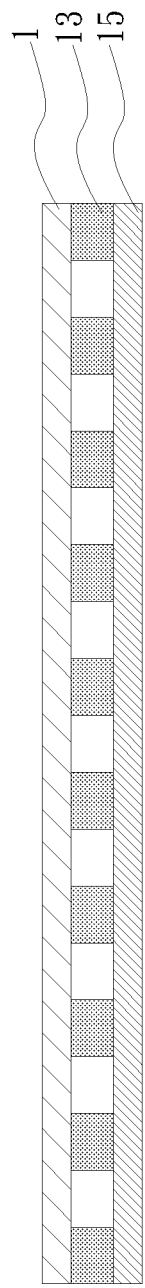
FIG. 4 is a sectional assembled view of a second embodiment of the attachment structure of the present invention.

Please now refer to FIG. 4, which is a sectional assembled view of a second embodiment of the attachment structure of the present invention. The second embodiment is partially identical to the first embodiment in structure and thus will not be redundantly described hereinafter. The second embodiment is different from the first embodiment in that a protection layer 15 is disposed on one face of the first adhesive layer 13 distal from the main body 1. The protection layer 15 is selected from a group consisting of a release paper, a silica gel, an oil film sheet and a thin sheet body made of polymer material. The thin sheet body made of polymer material is selected from a group consisting of polyvinyl chloride, nylon, polystyrene and polypropylene.

Figure 5:
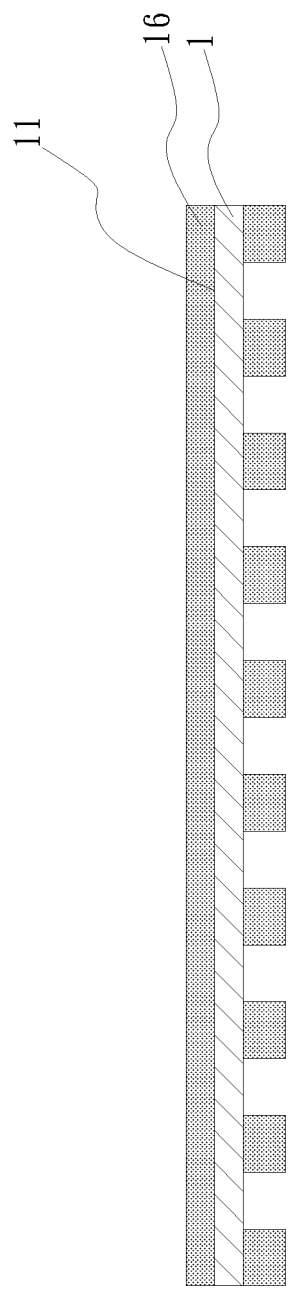
FIG. 5 is a sectional assembled view of a third embodiment of the attachment structure of the present invention.

Please now refer to FIG. 5, which is a sectional assembled view of a third embodiment of the attachment structure of the present invention. The third embodiment is partially identical to the first embodiment in structure and thus will not be redundantly described hereinafter. The third embodiment is different from the first embodiment in that a second adhesive layer 16 is disposed on the first side 11 of the main body 1. The second adhesive layer 16 is a plane adhesive fully painted on the surface of the first side 11.

Figure 6:
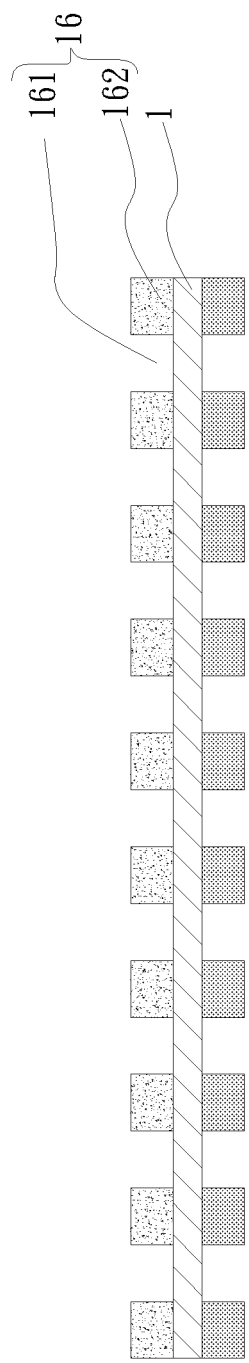
FIG. 6 is a sectional assembled view of a fourth embodiment of the attachment structure of the present invention.

Please now refer to FIG. 6, which is a sectional assembled view of a fourth embodiment of the attachment structure of the present invention. The fourth embodiment is partially identical to the third embodiment in structure and thus will not be redundantly described hereinafter. The fourth embodiment is different from the third embodiment in that the second adhesive layer 16 has multiple second passages 161. The second passages 161 are selectively transversely and longitudinally arranged to intersect or not to intersect each other. In this embodiment, the second passages 161 are, but not limited to, transversely and longitudinally arranged to intersect each other. The second passages 161 divide the second adhesive layer 16 into multiple second adhesive blocks 162. The second adhesive blocks 162 of the second adhesive layer 16 are formed on the first side 11 by means of dispensing. The second adhesive block 162 has a circular configuration, a square configuration, a triangular configuration, a trapezoidal configuration or any other geometrical configuration. In this embodiment, the second adhesive block 162 has a square configuration for illustration purposes.

Alternatively, the patterns (dots and plane face) of the second adhesive layers 16 of the third and fourth embodiments can be combined (not shown). In addition, the second adhesive layer 16 with the pattern of plane face and the pattern of dots can be symmetrically distributed or asymmetrically distributed.

Figure 7:
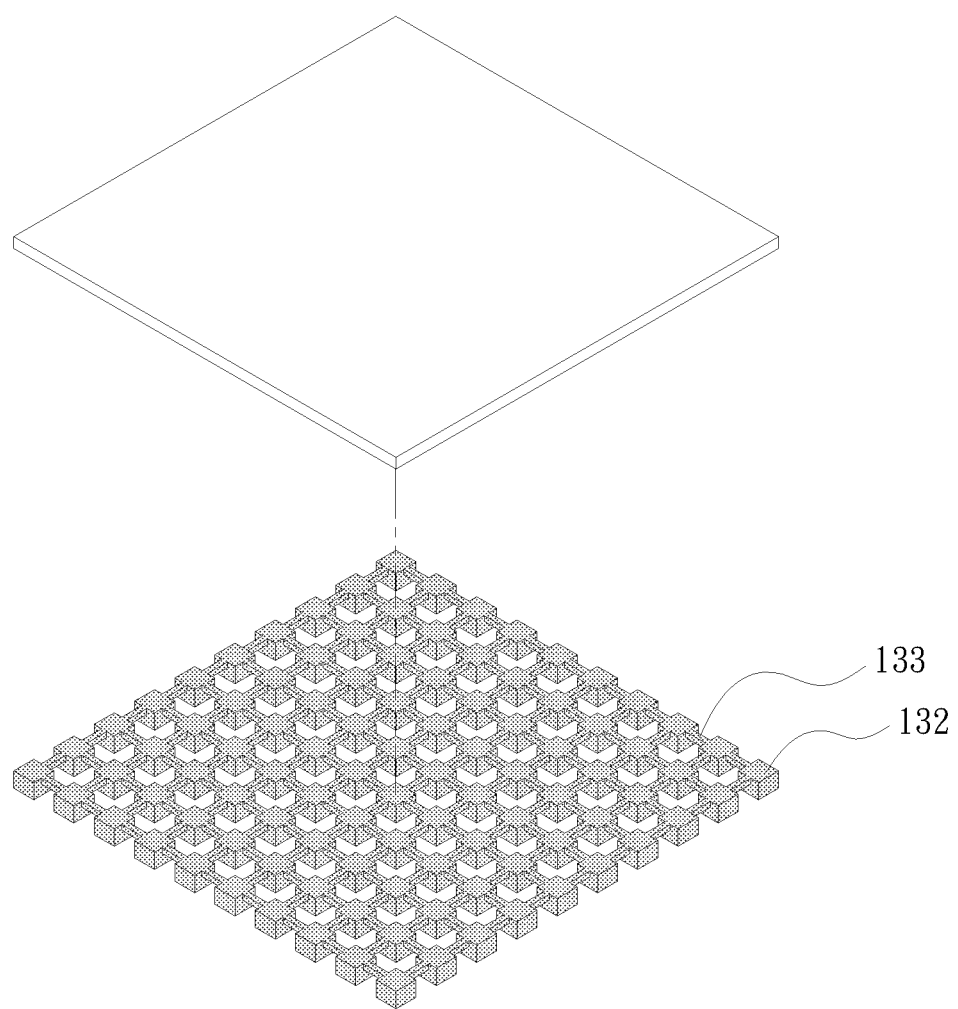
FIG. 7 is a sectional assembled view of a fifth embodiment of the attachment structure of the present invention.

Please now refer to FIG. 7, which is a sectional assembled view of a fifth embodiment of the attachment structure of the present invention. The fifth embodiment is partially identical to the first embodiment in structure and thus will not be redundantly described hereinafter. The fifth embodiment is different from the first embodiment in that a first connection body 133 is connected between each two adjacent first adhesive blocks 132. Two ends of the first connection body 133 are respectively connected with the adjacent first adhesive blocks 132.

Figure 8:
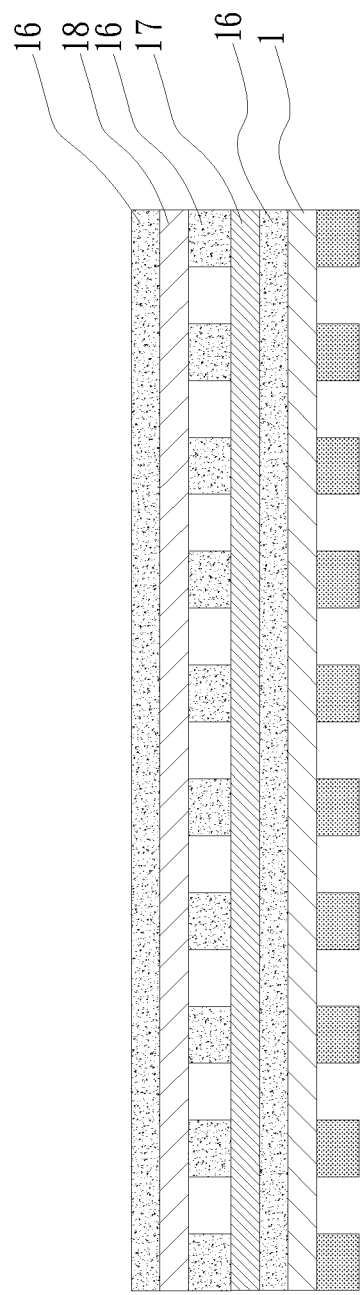
FIG. 8 is a sectional assembled view of a sixth embodiment of the attachment structure of the present invention.

Please now refer to FIG. 8, which is a sectional assembled view of a sixth embodiment of the attachment structure of the present invention. The sixth embodiment is partially identical to the third embodiment in structure and thus will not be redundantly described hereinafter. The sixth embodiment is different from the third embodiment in that an attachment article 17 is connected with one face of the second adhesive layer 16 distal from the main body 1 and a subsidiary attachment article 18 is further connected with the second adhesive layer 16. The attachment article 17 and the subsidiary attachment article 18 are made of a metal material or nonmetal material. The metal material is selected from a group consisting of gold, silver, copper, aluminum, stainless steel and titanium.

The nonmetal material is selected from a group consisting of porous sintered body (such as ceramic or semiconductor), graphite, polymer and natural polymer. The polymer is selected from a group consisting of foam rubber, polyethylene, polyvinyl chloride, nylon, polytetrafluoroethylene and silicone. The natural polymer is selected from a group consisting of shellac, amber, protein and nucleic acid.

The attachment article 17 and the subsidiary attachment article 18 can alternatively a complete structure or product unit such as a vapor chamber, a heat pipe, a handheld device case, a substrate or a circuit board. Moreover, another second adhesive layer 16 can be further disposed on the other side of the attachment article 17 and the subsidiary attachment article 18 can be overlapped with and attached to the second adhesive layer 16.

In the case that multiple attachment articles 17 and multiple subsidiary attachment articles 18 need to be overlapped and connected with each other, a second adhesive layer 16 can be disposed between each two adjacent attachment article 17 and subsidiary attachment article 18 to help in adhering the attachment article 17 and subsidiary attachment article 18 to each other.

That is, in the case that multiple layers of attachment articles 17 and multiple layers of subsidiary attachment articles 18 need to be attached to each other, the overlapping sequence is such that a second adhesive layer 16 is disposed on one side of the main body 1. An attachment article 17 (such as graphite) is further disposed on one face of the second adhesive layer 16 distal from the main body 1. Another second adhesive layer 16 is further disposed on one face of the attachment article 17 (graphite) distal from the aforesaid second adhesive layer 16. Then a subsidiary attachment article 18 (copper) is further disposed on one face of the second adhesive layer 16 distal from the attachment article 17 (graphite). Then another second adhesive layer 16 is further disposed on one face of the subsidiary attachment article 18 (copper) distal from the aforesaid second adhesive layer 16. Accordingly, the second adhesive layer 16, the attachment article 17 and the subsidiary attachment article 18 are sequentially alternately overlapped. In addition, the second adhesive layers 16 are, but not limited to, disposed by means of full painting or partial dispensing.

Figure 9A:
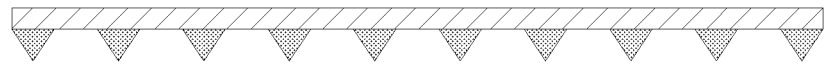
FIG. 9*a* is a sectional assembled view of a seventh embodiment of the attachment structure of the present invention.
Figure 9B:
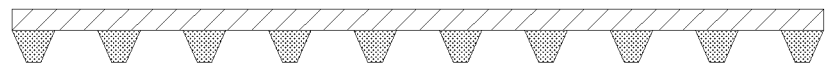
FIG. 9*b* is a sectional assembled view of the seventh embodiment of the attachment structure of the present invention.
Figure 9C:
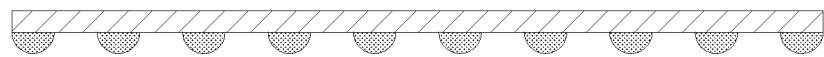
FIG. 9*c* is a sectional assembled view of the seventh embodiment of the attachment structure of the present invention.

Please now refer to FIG. 9, which is a sectional assembled view of a seventh embodiment of the attachment structure of the present invention. The seventh embodiment is partially identical to the fourth embodiment in structure and thus will not be redundantly described hereinafter. The seventh embodiment is different from the fourth embodiment in that the longitudinal section of the first adhesive block 132 of the first adhesive layer 13 has a triangular configuration (as shown in FIG. 9a) or a trapezoidal configuration (as shown in FIG. 9b) or a semicircular configuration (as shown in FIG. 9c).

Figure 10:
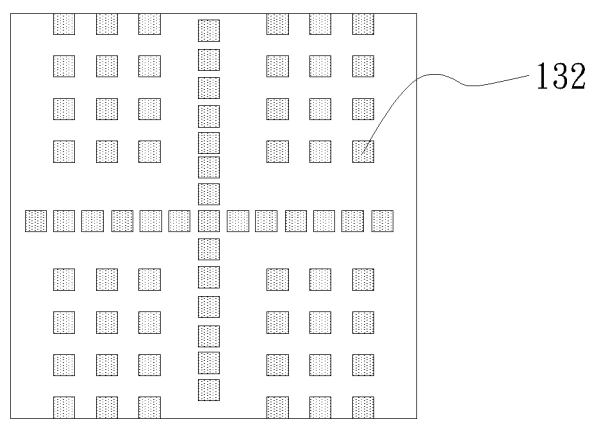
FIG. 10 is a top view of an eighth embodiment of the attachment structure of the present invention.

Please now refer to FIG. 10, which is a top view of an eighth embodiment of the attachment structure of the present invention. The eighth embodiment is partially identical to the first embodiment in structure and thus will not be redundantly described hereinafter. The eighth embodiment is different from the first embodiment in that the first adhesive blocks 132 are randomly arranged by high density or by low density.

Figure 11A:
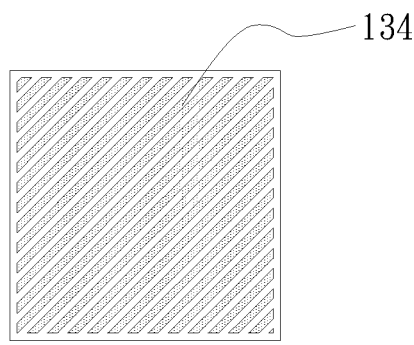
FIG. 11*a* is a top view of a ninth embodiment of the attachment structure of the present invention.
Figure 11B:
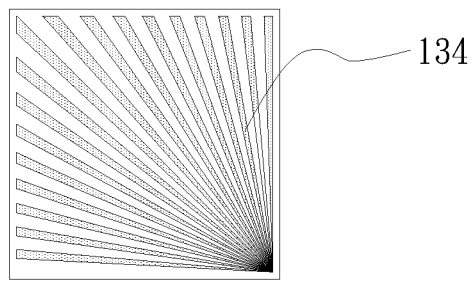
FIG. 11*b* is a top view of the ninth embodiment of the attachment structure of the present invention.

Please now refer to FIG. 11, which is a top view of a ninth embodiment of the attachment structure of the present invention. The ninth embodiment is partially identical to the first embodiment in structure and thus will not be redundantly described hereinafter. The ninth embodiment is different from the first embodiment in that the first passages 131 of the first adhesive layer 13 are transversely and longitudinally arranged without intersecting each other. In addition, the first passages 131 divide the first adhesive layer 13 into multiple first adhesive strips 134. The first adhesive strips 134 selectively obliquely extend (as shown in FIG. 11a) or radially extend (as shown in FIG. 11b).

Figure 12:
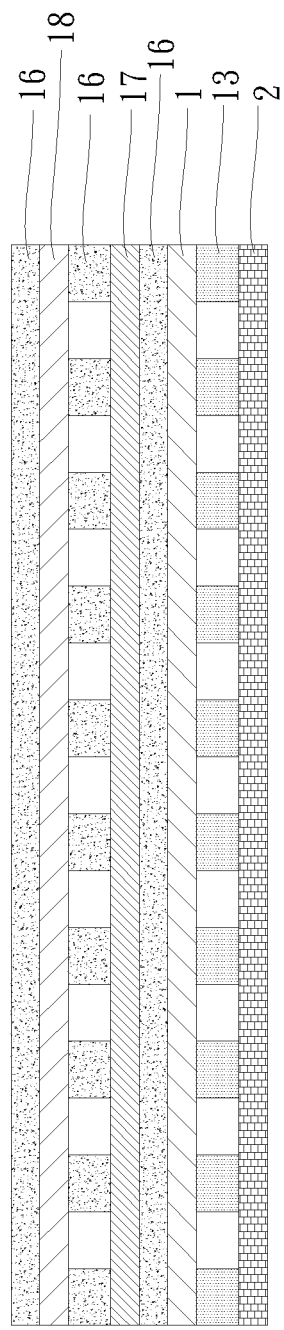
FIG. 12 is a sectional view of a tenth embodiment of the attachment structure of the present invention.

Please now refer to FIG. 12, which is a sectional view of a tenth embodiment of the attachment structure of the present invention. The tenth embodiment is partially identical to the sixth embodiment in structure and thus will not be redundantly described hereinafter. The tenth embodiment is different from the sixth embodiment in that the first adhesive layer 13 disposed on the second side 12 of the main body 1 is attached to and connected with a back cover 2. The second adhesive layer 16 disposed on the first side 11 of the main body 1 is attached to an attachment article 17. In this embodiment, the attachment article 17 is, but not limited to, graphite for illustration purposes. Another second adhesive layer 16 is disposed on one face of the attachment article 17 distal from the second adhesive layer 16. In addition, a subsidiary attachment article 18 is disposed on one face of the second adhesive layer 16 distal from the attachment article 17. In this embodiment, the subsidiary attachment article 18 is selected from a group consisting of copper, aluminum and titanium. Another second adhesive layer 16 is disposed on one face of the subsidiary attachment article 18 distal from the second adhesive layer 16. Another attachment article 17 or another subsidiary attachment article 18 can be further selectively attached to the second adhesive layer 16.

In the present invention, a first adhesive layer 13 is disposed on at least one side or both sides (first and second sides 11, 12) of the main body 1. The first adhesive layer 13 is formed with multiple first passages 131, which divide the first adhesive layer 13 into multiple first adhesive blocks 132 in the form of dots or multiple first adhesive strips 134 in the form of strips. Accordingly, when the main body 1 is overlaid on and attached to another attachment article or component or unit, the residual air can be exhausted to outer side through the first passages 131. Moreover, the first passages 131 help in dissipating the heat. Also, two attachment articles can be more tightly attached to each other without warping. Therefore, the two attachment articles can be fully attached to each other with excellent planarity and smoothness without any crimp or void. Accordingly, two layers of structure bodies can be attached to each other at lower technique without costing much time.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. An attachment structure comprising:
   a main body having a first side and a second side; and
   a first adhesive layer selectively disposed on one of the first and second sides, the first adhesive layer having multiple first passages that transversely and longitudinally extend to intersect each other, the first passages dividing the first adhesive layer into multiple first adhesive blocks, each first adhesive block having a first height dimension in a direction perpendicular to the main body, each two adjacent first adhesive blocks defining therebetween a hollow space of the first passages and wherein a first connection body is connected between each two adjacent first adhesive blocks, each first connection body having a second height dimension in a direction perpendicular to the main body, the second height dimension being less than the first height dimension, two ends of the first connection body being respectively connected with the adjacent first adhesive blocks;
   wherein the main body is made of one of a metal and non-metal material or can be a product structure body, the product structure body being selected from a group consisting of a circuit board, a heat pipe and a vapor chamber.

2. The attachment structure as claimed in claim 1, wherein the cross section of the first adhesive block has one of a circular configuration, a polygonal configuration or any other geometrical configuration.

3. The attachment structure as claimed in claim 1, wherein the first adhesive layer is viscous.

4. The attachment structure as claimed in claim 1, wherein a protection layer is disposed on one face of the first adhesive layer distal from the main body, the protection layer being selected from a group consisting of a release paper, a silica gel, an oil film sheet and a thin sheet body made of polymer material.

5. The attachment structure as claimed in claim 1, wherein a second adhesive layer is disposed on the first side of the main body, the second adhesive layer having multiple second passages, the second passages transversely and longitudinally extending to intersect each other, the second passages dividing the second adhesive layer into multiple second adhesive blocks, the cross section of the second adhesive block having a circular configuration, a polygonal configuration or any other geometrical configuration.

6. The attachment structure as claimed in claim 5, wherein an attachment article is connected with one face of the second adhesive layer distal from the main body and a subsidiary attachment article is indirectly connected with the second adhesive layer, the attachment article and the subsidiary attachment article being made of a metal material or nonmetal material, the metal material being selected from a group consisting of gold, silver, copper, aluminum, stainless steel and titanium, the nonmetal material being selected from a group consisting of porous sintered body (such as ceramic or semiconductor), graphite, polymer and natural polymer, the polymer being selected from a group consisting of foam rubber, polyethylene, polyvinyl chloride, nylon, polytetrafluoroethylene and silicone, the natural polymer being selected from a group consisting of shellac, amber, protein and nucleic acid, the attachment article and the subsidiary attachment article being alternatively a complete structure or product unit such as a vapor chamber, a heat pipe, a handheld device case, a substrate or a circuit board.

7. The attachment structure as claimed in claim 1, wherein the main body is flexible.

8. The attachment structure as claimed in claim 1, wherein the first adhesive blocks are arranged at equal intervals.

9. The attachment structure as claimed in claim 1, wherein the first passages of the first adhesive layer transversely and longitudinally extend without intersecting each other, the first passages dividing the first adhesive layer into multiple first adhesive strips, the first adhesive strips obliquely extending.

10. The attachment structure as claimed in claim 1, wherein the main body is transparent.

11. The attachment structure as claimed in claim 1, wherein the main body is light-permeable.

12. The attachment structure as claimed in claim 1, wherein the main body is made of a metal material, the metal material being selected from a group consisting of gold, silver, copper, aluminum, stainless steel and titanium.

13. The attachment structure as claimed in claim 1, wherein the first passages of the first adhesive layer transversely and longitudinally extend without intersecting each other, the first passages dividing the first adhesive layer into multiple first adhesive strips, the first adhesive strips radially extending.

14. The attachment structure as claimed in claim 1, wherein the first adhesive layer is not viscous.

15. The attachment structure as claimed in claim 1, wherein the main body is inflexible.

16. The attachment structure as claimed in claim 1, wherein the first adhesive blocks are arranged at unequal intervals.

17. The attachment structure as claimed in claim 1, wherein the main body is nontransparent.

18. The attachment structure as claimed in claim 1, wherein the main body is semitransparent.

19. The attachment structure as claimed in claim 1, wherein the main body is opaque.

20. The attachment structure as claimed in claim 1, wherein the main body is light impermeable.

21. The attachment structure as claimed in claim 1, wherein the main body is made of a non-metal material being selected from a group consisting of a porous sintered body (such as ceramic or semiconductor, graphite, polymer and natural polymer, the polymer being selected from a group consisting of foam rubber, polyethylene, polyvinyl chloride, nylon, polytetrafluorethylene and silicon, the natural polymer being selected from a group consisting of shellac, amber, protein and nucleic acid.

* * * * *